(12) United States Patent
Fujimoto et al.

(10) Patent No.: US 9,488,125 B2
(45) Date of Patent: Nov. 8, 2016

(54) CONTROL DEVICE OF DIRECT-INJECTION ENGINE

(71) Applicant: Mazda Motor Corporation, Aki-gun, Hiroshima (JP)

(72) Inventors: Masahiko Fujimoto, Hiroshima (JP); Noriyuki Ota, Hiroshima (JP); Masatoshi Seto, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/629,776

(22) Filed: Feb. 24, 2015

(65) Prior Publication Data

US 2015/0275818 A1    Oct. 1, 2015

(30) Foreign Application Priority Data

Mar. 28, 2014    (JP) .................. 2014-067573

(51) Int. Cl.
| | |
|---|---|
| *F01N 3/00* | (2006.01) |
| *F02D 41/40* | (2006.01) |
| *F01N 9/00* | (2006.01) |
| *F02D 41/00* | (2006.01) |
| *F02M 25/12* | (2006.01) |
| *F02D 13/02* | (2006.01) |
| *F02D 41/38* | (2006.01) |

(52) U.S. Cl.
CPC .............. *F02D 41/405* (2013.01); *F01N 9/00* (2013.01); *F02D 13/0234* (2013.01); *F02D 41/0025* (2013.01); *F02M 25/12* (2013.01); *F01N 2900/16* (2013.01); *F02B 2275/14* (2013.01); *F02D 2041/389* (2013.01); *Y02T 10/123* (2013.01); *Y02T 10/18* (2013.01); *Y02T 10/44* (2013.01)

(58) Field of Classification Search
USPC ......... 60/274, 276, 284, 285, 286, 289, 290, 60/292, 293
See application file for complete search history.

(56) References Cited

U.S. PATENT DOCUMENTS

| | | | | |
|---|---|---|---|---|
| 6,276,334 | B1 * | 8/2001 | Flynn ....................... | F02B 19/14 123/435 |
| 6,622,689 | B2 * | 9/2003 | Hasegawa ................. | F01L 1/34 123/294 |
| 8,156,911 | B2 * | 4/2012 | Ikeda ..................... | F02D 41/402 123/143 B |
| 8,800,536 | B2 * | 8/2014 | Plata ....................... | C01B 13/11 123/536 |
| 8,850,795 | B2 * | 10/2014 | Ikeda ........................ | F01L 3/24 60/275 |
| 9,169,821 | B2 * | 10/2015 | McAlister .............. | F02M 57/06 |

FOREIGN PATENT DOCUMENTS

JP    2002309941 A    10/2002

* cited by examiner

*Primary Examiner* — Binh Q Tran
(74) *Attorney, Agent, or Firm* — Alleman Hall McCoy Russell & Tuttle LLP

(57) ABSTRACT

A control device of a direct-injection engine is provided. The control device includes an engine body having a piston provided inside a cylinder and a combustion chamber formed by the cylinder and the piston, an injector for injecting fuel into the combustion chamber, an ozone generator for generating ozone inside the combustion chamber, and a controller for controlling the injector and the ozone generator. The controller controls the injector to inject a first amount of the fuel and, after this fuel is ignited, to inject a second amount of the fuel, and the controller controls the ozone generator to generate ozone in synchronization with the fuel injection that is performed by the injector after the fuel ignition.

2 Claims, 6 Drawing Sheets

CONTROL DEVICE OF DIRECT-INJECTION ENGINE

BACKGROUND

The present invention relates to a control device of a direct-injection engine.

Conventionally, direct-injection engines in which ozone is supplied into a cylinder have been known.

For example, JP2002-309941A discloses a direct-injection engine, in which fuel and ozone are supplied into a cylinder on compression stroke and the fuel and the ozone are well mixed with each other, so as to improve self-ignitability.

Incidentally, depending on the engine, there are cases where fuel is injected and, even after the fuel is ignited inside a combustion chamber, more fuel is still injected. Examples of such cases include a case where during a main injection in which fuel for causing a main combustion is injected, the fuel is ignited and the fuel injection continues for a while thereafter, and a case where a post injection is performed after the fuel injected by the main injection is ignited. In such cases, by the timing that the fuel injected after the ignition combusts, an amount of oxygen inside the combustion chamber becomes small due to the combustion caused by the preceding ignition. Therefore, the combustion chamber forms an environment where smoke is easily produced.

SUMMARY

The present invention is made in view of the above situations and reduces smoke in a case where fuel is injected and, after this fuel is ignited, more fuel is injected.

According to one aspect of the present invention, a control device of a direct-injection engine is provided. The control device includes an engine body having a piston provided inside a cylinder, and a combustion chamber formed by the cylinder and the piston, an injector for injecting fuel into the combustion chamber, an ozone generator for generating ozone inside the combustion chamber, and a controller for controlling the injector and the ozone generator. The controller controls the injector to inject a first amount of the fuel and, after this fuel is ignited, to inject a second amount of the fuel, and the controller controls the ozone generator to generate ozone in synchronization with the fuel injection that is performed by the injector after the fuel ignition.

According to this configuration, the fuel is injected also after the fuel ignition. By the timing that the fuel injected after the ignition combusts, an amount of oxygen inside the combustion chamber becomes small due to combustion caused by the preceding ignition. Therefore, smoke is easily produced. For this reason, ozone is generated in synchronization with the fuel injection after the ignition. Thus, the ozone acts on the fuel injected after the ignition and OH radicals are generated from this fuel. As a result, oxidation of soot is stimulated and smoke can be reduced.

Moreover, the controller may control the injector to perform a main injection in which the first amount of the fuel is injected and that still continues after a part of the first amount of the fuel injected in the main injection is ignited, and the controller may control the ozone generator to generate ozone in synchronization with the main injection.

Furthermore, the controller may control the ozone generator to generate ozone at a timing such that a period of generating the ozone at least partially overlaps with a period of performing the main injection in which the first amount of the fuel is injected and that still continues after the part of the first amount of the fuel injected in the main injection is ignited.

With these configurations, fuel is ignited during the main injection, and while the main injection continues even thereafter, ozone is generated in synchronization with the main injection after the ignition. In the case where fuel is ignited during the continuous main injection, by the timing that the fuel injected after the ignition combusts, the oxygen amount inside the combustion chamber may be insufficient. Therefore, through generating ozone to act on the fuel injected by the main injection that continues even after the ignition, OH radicals are generated from this fuel and the oxidation of soot can be stimulated. As a result, smoke that is produced from the fuel injected by the main injection that continues even after the ignition can be reduced.

Moreover, the controller may control the injector to perform a main injection and a post injection in which a fuel injection is performed on expansion stroke after all of the first amount of the fuel injected by the main injection is ignited, with a time interval from the main injection. The controller may control the ozone generator to generate ozone in synchronization with the post injection.

According to this configuration, the controller controls the injector to perform the main injection and the post injection. In this case, by the timing that the fuel injected by the post injection combusts, the oxygen amount inside the combustion chamber becomes small. Therefore, the controller controls the ozone generator to generate ozone in synchronization with the post injection. Thus, OH radicals are generated from the fuel injected by the post injection and the oxidation of soot can be stimulated. As a result, smoke that is produced from the fuel injected by the post injection can be reduced.

Moreover, the post injection may be performed while a heat release rate of main combustion decreases after reaching a peak thereof.

According to this configuration, the post injection is performed while the heat release rate of the main combustion decreases after its peak. Due to the combustion of the fuel injected by the post injection, the decreasing heat release rate temporarily increases or the decreasing speed of the heat release rate temporarily slows down. Thus, the heat release rate increases by the length or fuel amount of the post injection, and the combustion period accordingly extends.

Moreover, the controller may perform a first ozone application in which the ozone generator is controlled to generate ozone on a compression stroke before the main injection, and the controller may perform a second ozone application in which the ozone generator is controlled to generate ozone at a timing such that a period of generating ozone at least partially overlaps with a period of performing the post injection.

According to this configuration, the controller performs the first ozone application and the second ozone application. By the first ozone application, oxygen inside the combustion chamber is activated, and the ignitability for the main combustion can be improved. By the second ozone application, the ozone acts on the fuel injected by the post injection, and OH radicals are generated. The oxidation of soot that is produced from the fuel injected by the post injection can be stimulated by the OH radicals.

Moreover, the control device may also include a catalyst provided inside an exhaust passage. The controller may control the injector to perform the post injection when the catalyst is inactivated.

Furthermore, the controller may stop the post injection by the injector and the second ozone application by the ozone generator when the catalyst is activated.

According to these configurations, the post injection is performed when the catalyst is inactive. Since the post injection is performed to activate the catalyst, a combustion timing of the fuel injected by the post injection tends to be set near an open timing of an exhaust valve, in other words, as late as possible, so that heat produced by the combustion acts on the catalyst. As a result, since the oxygen inside the combustion chamber is used in the combustion caused by the main injection, by the timing that the fuel injected by the post injection combusts, the oxygen amount tends to be insufficient. Therefore, the controller controls the ozone generator to generate ozone in synchronization with the post injection. Thus, OH radicals are generated from the fuel injected by the post injection and the oxidation of soot can be stimulated. As a result, smoke that is produced from the fuel injected by the post injection can be reduced.

DETAILED DESCRIPTION OF EMBODIMENTS

Hereinafter, one illustrative embodiment of the present invention is described with reference to the appended drawings.

Figure 1:
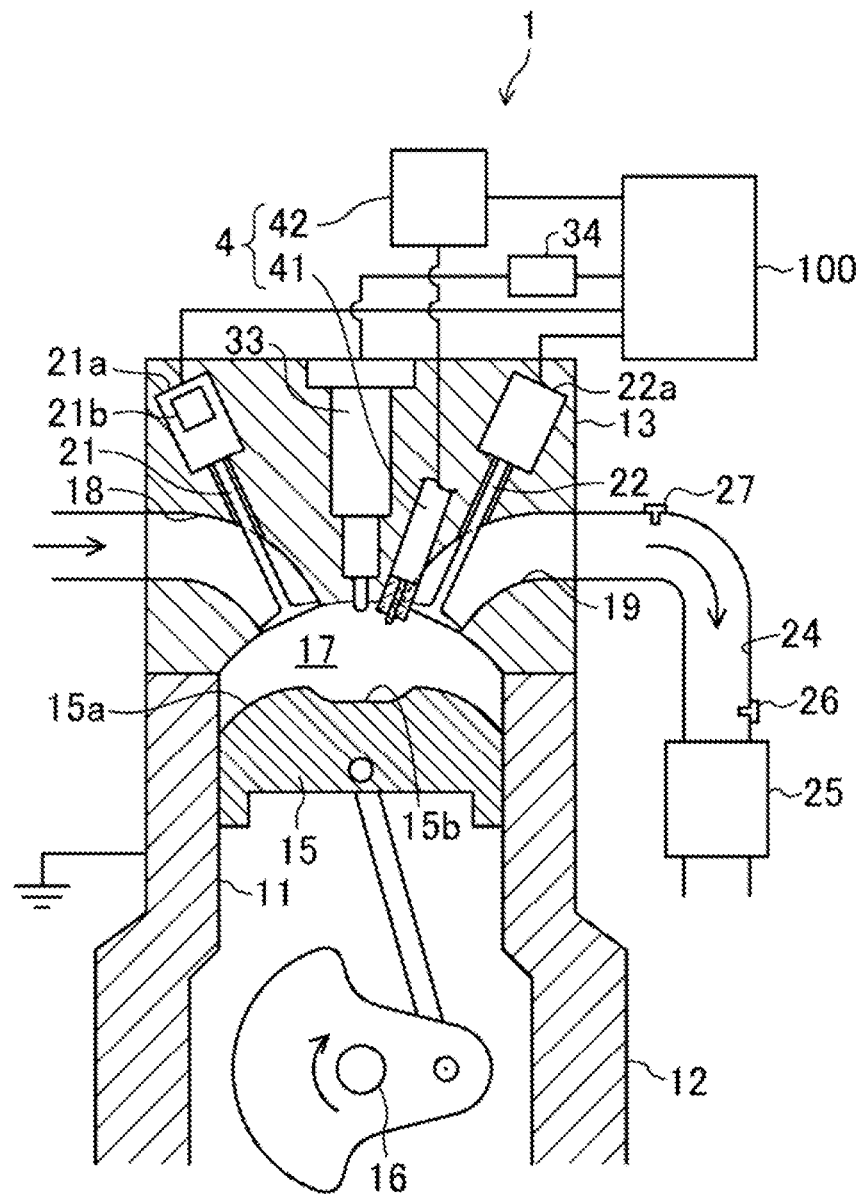
FIG. 1 is a schematic configuration view illustrating a gasoline direct-injection engine.

FIG. 1 is a schematic view illustrating a gasoline direct-injection engine (hereinafter, simply referred to as the "engine") 1 according to this embodiment. In this embodiment, the engine 1 includes various actuators and various sensors associated with an engine body of the engine 1, and an engine controller 100 for controlling the actuators based on signals from the sensors.

The engine 1 is installed in a vehicle (e.g., automobile). The engine body of the engine 1 includes a cylinder block 12 and a cylinder head 13 placed on the cylinder block 12. A plurality of cylinders 11 are formed inside the cylinder block 12 (only one cylinder 11 is illustrated in FIG. 1). A water jacket (not illustrated) through which a coolant flows is formed inside the cylinder block 12 and the cylinder head 13. Fuel of the engine 1 is gasoline in this embodiment; however, the gasoline may contain bioethanol, or it may be any kind of fuel as long as it is liquid fuel at least containing gasoline.

Pistons 15 are reciprocatably inserted into the cylinders 11, respectively. Each piston 15 forms a combustion chamber 17 together with the cylinder 11 and the cylinder head 13. The combustion chamber 17 is a so-called dome-type combustion chamber. Specifically, a ceiling surface of the combustion chamber 17 formed by the cylinder head 13 has a shape formed by rotating a predetermined arch centering on a central axis of the cylinder 11. A crown surface 15a of the piston 15 is also formed into a dome shape, corresponding to the ceiling surface of the combustion chamber 17. Note that, a concaved cavity 15b is formed in a central portion of the crown surface 15a. Further, each of the shapes of the ceiling surface and the crown surface 15a of the piston 15 may be any shape as long as a high geometric compression ratio described later can be achieved. For example, the ceiling surface (a bottom surface of the cylinder head 13) may have a triangular roof-like shape formed by an intake-side inclined surface portion and an exhaust-side inclined surface portion (a so-called pent-roof type).

Although only one is illustrated in FIG. 1, two intake ports 18 are formed in the cylinder head 13 for each cylinder 11, and they communicate with the combustion chamber 17 by opening to the bottom surface of the cylinder head 13 (the intake-side inclined surface portion of the ceiling surface of the combustion chamber 17). Similarly, two exhaust ports 19 are formed in the cylinder head 13 for each cylinder 11, and they communicate with the combustion chamber 17 by opening to the bottom surface of the cylinder head 13 (the exhaust-side inclined surface portion of the ceiling surface of the combustion chamber 17). The intake ports 18 are connected with an intake passage (not illustrated) through which fresh air to be introduced into the cylinder 11 flows. A throttle valve for adjusting an intake air flow rate is provided within the intake passage, and an opening of the throttle valve is adjusted based on a control signal (desired throttle opening signal described later) from the engine controller 100. On the other hand, the exhaust ports 19 are connected with an exhaust passage 24 through which burned gas (exhaust gas) from the cylinder 11 flows. A three-way catalyst 25 and a catalyst temperature sensor 26 for detecting a temperature of the three-way catalyst 25 are provided in the exhaust passage 24. The three-way catalyst 25 may be referred to as the catalyst. An exhaust gas temperature sensor 27 for measuring a temperature of the exhaust gas is provided in the exhaust passage 24, near the exhaust port 19. Moreover, an EGR passage (not illustrated) for circulating the exhaust gas back to the intake system is provided to communicate with the exhaust passage and the intake passage, and an EGR valve for adjusting a flow rate of the exhaust gas to be circulated (EGR gas) is provided in the EGR passage.

Intake valves 21 are disposed in the cylinder head 13 to shut off (close) the intake ports 18 from the combustion chamber 17 and exhaust valves 22 are disposed in the cylinder head 13 to shut off (close) the exhaust ports 19 from the combustion chamber 17. Each intake valve 21 is operated by an intake valve operating mechanism 21a, and each exhaust valve 22 is operated by an exhaust valve operating mechanism 22a. The intake and exhaust valves 21 and 22 reciprocate at predetermined timings to open and close the intake and exhaust ports 18 and 19, respectively, and thus, gas within the cylinder 11 is exchanged. The intake and exhaust valve operating mechanisms 21a and 22a have respective intake and exhaust camshafts (not illustrated) operably coupled to a crankshaft 16, and the intake and exhaust camshafts rotate in synchronization with a rotation of the crankshaft. Moreover, at least the intake valve operating mechanism 21a includes a variable phase mechanism (Variable Valve Timing: VVT) 21b driven by either one of a hydraulic force and a mechanic force and for continuously varying a phase of the intake camshaft within a predetermined angle range. Note that, a variable lift mechanism for continuously varying a valve lift (Continuous Variable Valve Lift: CVVL) may be provided along with the VVT 21b.

An injector 33 for directly injecting the fuel into each cylinder (each combustion chamber 17) is disposed in the cylinder head 13, on the central axis of the cylinder 11. The injector 33 is fixedly attached to the cylinder head 13 by a well-known structure using a bracket, for example. A tip of the injector 33 is oriented toward a central position of the ceiling portion of the combustion chamber 17.

The engine 1 includes a fuel supply system 34. The fuel supply system 34 has an electric circuit for driving each injector 33 and a fuel supply subsystem for supplying the fuel to each injector 33. An engine controller 100 outputs an injection signal to the electric circuit to operate the injector 33 via the electric circuit, and causes the injector 33 to inject a desired amount of fuel into the cylinder. Thus, the engine controller 100 controls a timing and amount of the fuel to be injected from the injector 33, via the fuel supply system 34.

Moreover, the engine 1 includes an ozone generator 4. The ozone generator 4 has an electric discharge plug 41 and a pulsed voltage generation device 42.

Figure 2:
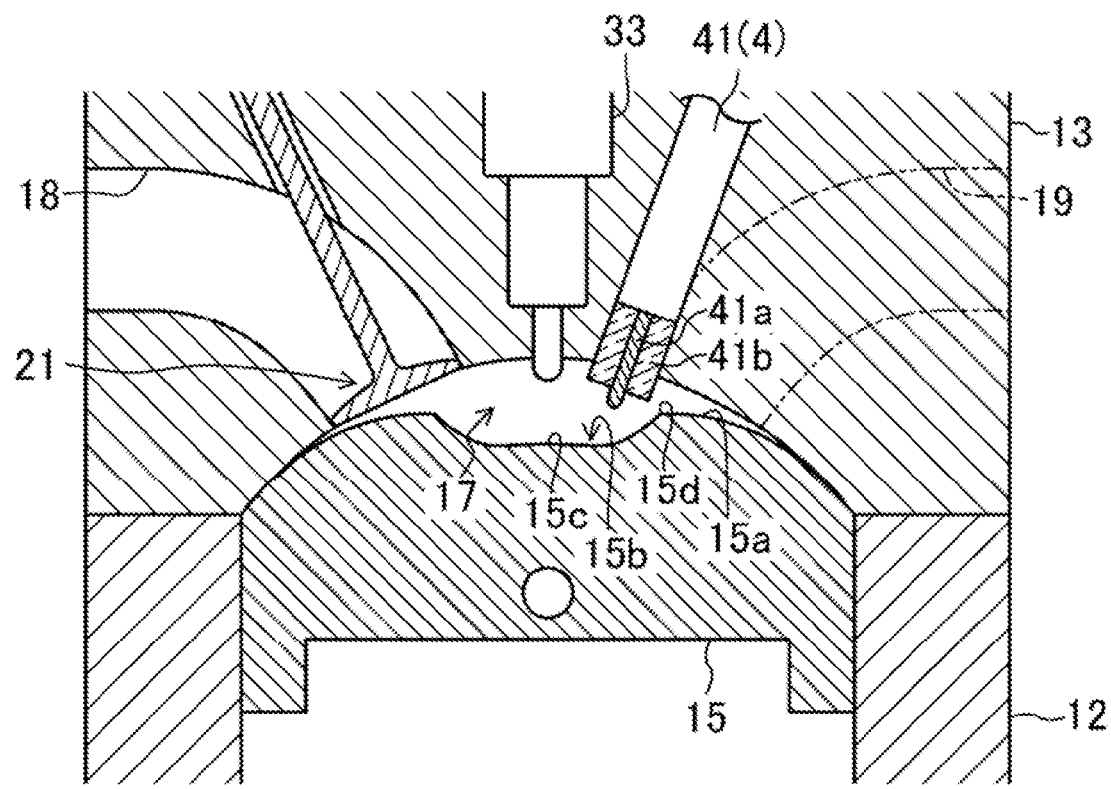
FIG. 2 is a schematic configuration view illustrating the periphery of a combustion chamber in a state where a piston is at a compression top dead center.

As illustrated in FIG. 2, a stick-shaped electrode 41a is provided to a tip part of the electric discharge plug 41. An insulator 41b is provided around the electrode 41a to electrically insulate the electrode 41a from the surrounding structures. The electric discharge plug 41 is fixed to the cylinder head 13 by a well-known structure, such as a screw. Under this state, the electrode 41a projects into the combustion chamber 17 from the ceiling surface of the combustion chamber 17. The electrode 41a is electrically insulated from the cylinder block 12 and the cylinder head 13 by the insulator 41b.

In a state where the piston 15 is at a compression top dead center (CTDC), a tip of the electrode 41a is located closer to a ridge part 15d than a center 15c of the cavity 15b. The ridge part 15d is formed by the circumferential portion of the cavity 15b and the other part of the crown surface 15a.

Figure 3:
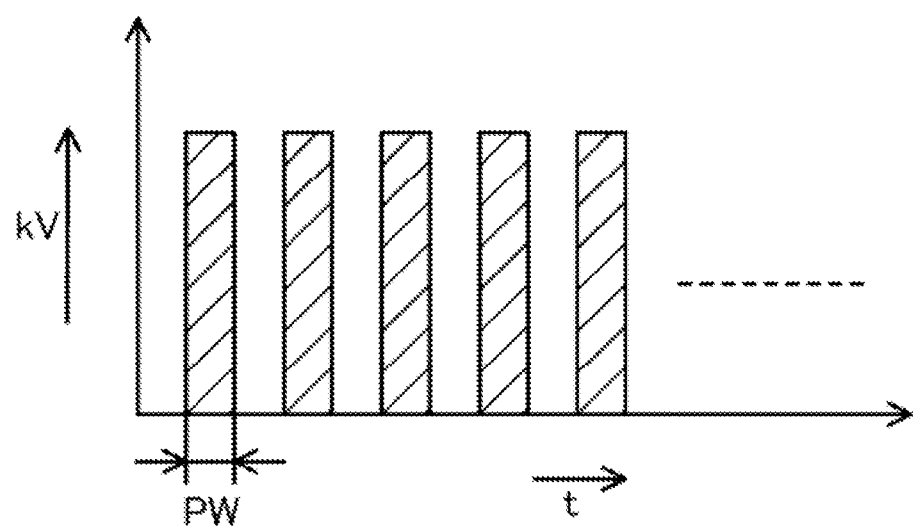
FIG. 3 is a chart schematically illustrating an example of a short-pulsed high voltage outputted from a pulse generation device.

The pulsed voltage generation device 42 is electrically connected with the electric discharge plug 41 and applies a pulsed voltage to the electric discharge plug 41. Specifically, as illustrated in FIG. 3, the pulsed voltage generation device 42 outputs a pulsed voltage of 10 kV or higher with a pulse width PW of 50 ns or shorter (short-pulsed high voltage) intermittently at high frequency. The pulsed voltage generation device 42 receives a control signal from the engine controller 100 and applies the short-pulsed high voltage to the electric discharge plug 41.

The ozone generator 4 causes streamer electric discharge inside the combustion chamber 17 by applying the short-pulsed high voltage to the electric discharge plug 41, and generates ozone inside the combustion chamber 17.

Figure 4:
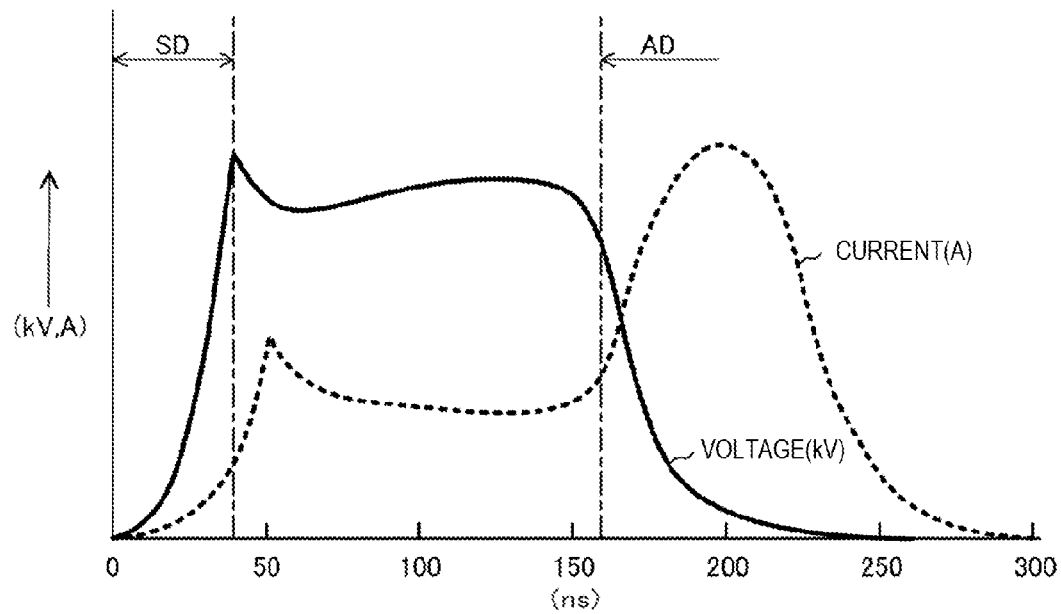
FIG. 4 is a chart describing short-pulsed electric discharge.

FIG. 4 schematically illustrates one example of changes in a current and a voltage when a high voltage is applied between a stick-shaped electrode and a cylindrical electrode disposed near the stick-shaped electrode for an extremely short period of time.

According to FIG. 4, a current increases after a voltage increases. Therefore, at a timing for the voltage to reach a predetermined high voltage, the current hardly flows. Then, the voltage is kept at high voltage for a while, and the current starts to slightly flow. Further later, the current sharply increases, and when a high current flows between the electrodes, the voltage drops.

Within an early range for the voltage to reach the predetermined high voltage, streamer electric discharge occurs (streamer electric discharge range SD), and within a latter range where the voltage drops and the current sharply increases, arc electric discharge occurs (arc electric discharge range AD). An intermediate range between the ranges SD and AD is a transition range.

Within the transition range and the arc electric discharge range AD, there is a possibility of causing a spark, heat or the like, whereas within the streamer electric discharge range SD, there is no such possibility. Therefore, by applying the high voltage with short pulse width which does not exceed the voltage within the streamer electric discharge range SD, the streamer electric discharge can be produced stably without causing a spark or the like inside the combustion chamber 17. As a result, ozone can be stably generated and ozone generation efficiency can be improved.

The engine controller 100 is a controller based on a well-known microcomputer, and it includes a processor for executing programs, a memory comprised of, for example, a RAM and a ROM for storing the programs and data, and an input/output (I/O) bus for inputting and outputting electric signals. The engine controller 100 may be referred to as the controller.

Figure 5:
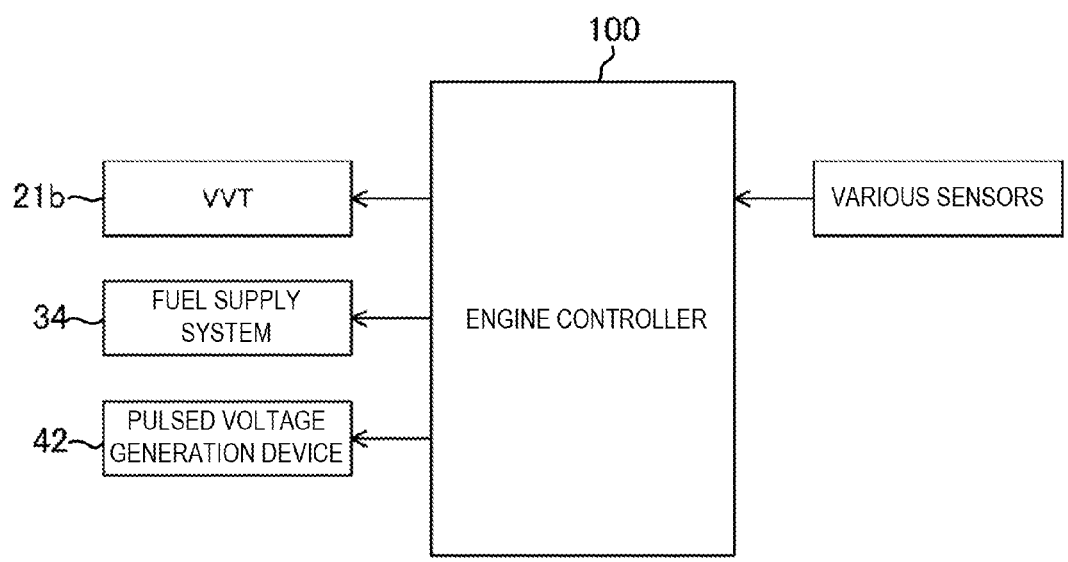
FIG. 5 is a block diagram of an engine controller.

As illustrated in FIG. 5, the engine controller 100 receives signals from various sensors, such as an airflow sensor, a crank angle sensor, an accelerator opening sensor, and a vehicle speed sensor. Based on these input signals, the engine controller 100 obtains control parameters of the engine 1, such as the desired throttle opening signal, a fuel injection pulse, an ignition signal, and a valve phase angle signal. Further, the engine controller 100 outputs the signals to the throttle valve, the VVT 21b, the EGR valve, the fuel supply system 34, and the pulsed voltage generation device 42, and the like.

A geometric compression ratio $\epsilon$ of the engine 1 is between 15:1 and 40:1, and preferably between 25:1 and 35:1. In this embodiment, the engine 1 achieves "compression ratio=expansion ratio." Therefore, the engine 1 has a comparatively high expansion ratio, as well as the high compression ratio. Note that, a configuration which achieves "compression ratio≤expansion ratio" (e.g., Atkinson cycle or Miller cycle) may be adopted. Moreover, for example, in a case of closing the intake valve at a retarded timing, an effective compression ratio of the engine 1 is set to 12:1 or larger. The effective compression ratio of the engine 1 is preferably set to 18:1 or larger.

As illustrated in FIG. 1, the combustion chamber 17 is formed by the wall surface of the cylinder 11, the crown surface of the piston 15, the bottom surface of the cylinder head 13 (i.e., ceiling surface), and surfaces of valve heads of the intake and exhaust valves 21 and 22. Hereinafter, each of the surfaces forming the combustion chamber 17 may be referred to as the "partial surface". Further, to reduce a cooling loss, heat-insulating layers are provided to the respective partial surfaces. A heat conductivity of each of the heat-insulating layers is set lower than its corresponding metal mother member constituting the combustion chamber 17 so as to reduce the heat of combustion gas within the combustion chamber 17 released through the corresponding partial surface. For example, as the material of each mother member, either one of aluminum alloy and cast iron is adopted for the cylinder block 12, the cylinder head 13, and the piston 15, and heat-resistant steel, cast iron or the like is adopted for the intake and exhaust valves 21 and 22.

Moreover, each heat-insulating layer 6 preferably has a smaller volumetric specific heat than the corresponding mother member, in view of reducing the cooling loss. Specifically, although a gas temperature inside the combustion chamber 17 varies depending on the progression of the combustion cycle, with the conventional engine without the heat-insulating structure of the combustion chamber 17, the cooling water flows inside the water jacket formed in the cylinder head and the cylinder block and, thus, the temperature of each surface forming the combustion chamber 17 is maintained substantially fixed regardless of the progression of the combustion cycle.

On the other hand, since the cooling loss is determined based on "cooling loss=heat transmissibility ×heat transmission area ×(gas temperature—partial surface temperature)," the cooling loss becomes larger as a difference between the gas temperature and the wall surface temperature becomes larger. To reduce the cooling loss, although it is preferred to reduce the difference between the gas temperature and the partial surface temperature, when the temperature of the partial surface of the combustion chamber 17 is maintained substantially fixed by the cooling water, it is unavoidable that the temperature difference increases due to variation of the gas temperature. Thus, it is preferred to reduce a heat capacity of the heat-insulating layer 6 so that the temperature of the partial surface of the combustion chamber 17 changes following the variation of the gas temperature inside the combustion chamber 17.

The heat-insulating layer 6 may be formed by plasma thermal spray of a ceramic material (e.g., $ZrO_2$) to coat the mother member. The ceramic material may contain multiple micro-pores. In this manner, the heat conductivity and volumetric specific heat of the heat-insulating layer 6 can be even lower.

Moreover, in this embodiment, an inner wall of the intake port 18 is made of aluminum titanic acid which has extremely low heat conductivity and excellent heat-insulating and also heat resistance properties. With this configuration, a temperature increase of the fresh air by receiving heat from the cylinder head 13 when the fresh air passes through the intake ports 18 can be reduced or avoided. Thus, the temperature of the fresh air introduced into the cylinder 11 (gas temperature in an early stage) becomes low, and therefore, the gas temperature during the combustion decreases, which is advantageous in reducing the difference between the gas temperature and the temperature of the partial surface of the combustion chamber 17. Since the reduction of the gas temperature during the combustion can reduce the heat transmissibility, this configuration is also advantageous in reducing the cooling loss.

In this embodiment, a heat-insulating layer is formed inside the cylinder (combustion chamber 17) by a gas layer in addition to the heat-insulating structures of the combustion chamber 17 and the intake ports 18, so as to significantly reduce the cooling loss.

Specifically, the engine controller 100 outputs the injection signal to the electric circuit of the fuel supply system 34 so that the injector 33 injects the fuel into the combustion chamber 17 on the compression stroke so as to form the gas layer containing the fresh air in an outer circumferential section inside the cylinder (combustion chamber 17) of the engine 1 and the mixture gas layer in the central section inside thereof. In other words, by controlling the injector 33 to inject the fuel into the combustion chamber 17 on the compression stroke and reducing the penetration degree (length) of the injected fuel spray to the extent that the fuel spray does not reach a peripheral section inside the combustion chamber 17, stratified layers including the mixture gas layer formed in the central section of the combustion chamber 17, and the gas layer containing the fresh air and formed around the mixture gas layer, are realized. This gas layer may contain the fresh air alone or may contain burned gas (i.e., EGR gas) in addition to the fresh air. Note that, a slight amount of fuel is allowed to be mixed in the gas layer as long as the fuel contained therein is leaner than in the mixture gas layer so that the gas layer can function as the heat-insulating layer.

If the fuel self-ignites in the state where the gas layer and the mixture gas layer are formed as described above, the flame of the mixture gas layer is prevented from contacting with the wall surface of the cylinder 11 by the gas layer formed between the mixture gas layer and the wall surface of the cylinder 11, and the heat release from the wall surface of the cylinder 11 can be reduced by the gas layer serving as the heat-insulating layer. As a result, the cooling loss can be reduced significantly.

Note that, the reduction of the cooling loss alone generally does not contribute much in improving an indicated thermal efficiency since the reduced amount of the cooling loss is converted into an exhaust loss; however, with the engine 1 of this embodiment, by the high expansion ratio due to the high compression ratio, the energy of the combustion gas corresponding to the reduced amount of the cooling loss is efficiently converted into machinery work. In other words, it can be said that the engine 1 is significantly improved in the indicated thermal efficiency by adopting the configuration with which both the cooling and exhaust losses can be reduced.

The engine 1 configured as above performs self-ignition combustion over an entire operating range. The engine controller 100 controls the injector 33 to perform the fuel injection such that main combustion (combustion for generating an engine torque, combustion which produces a largest heat amount in a single cycle) by the self-ignition occurs after the CTDC.

Figure 6:
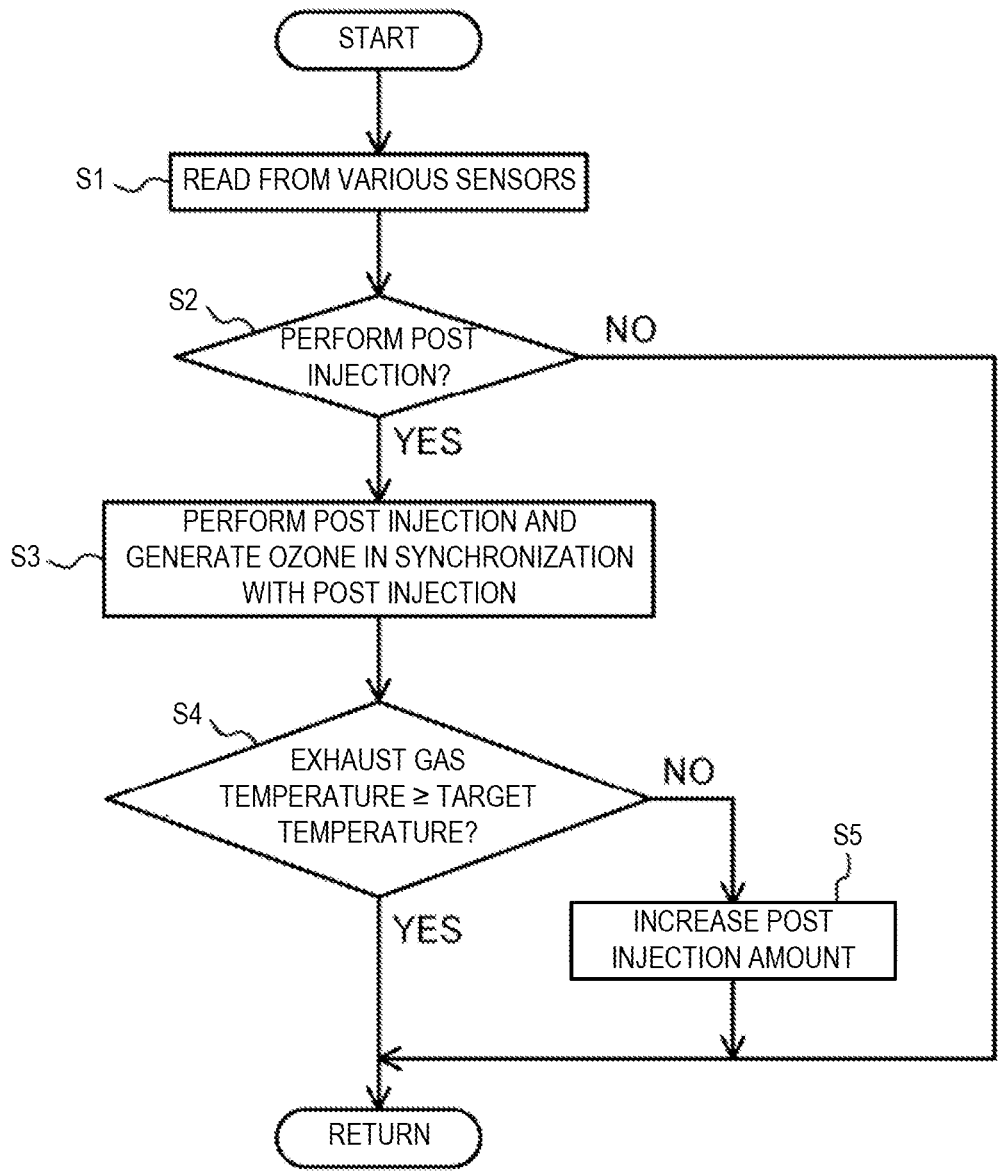
FIG. 6 is a flowchart of when a post injection is performed.
Figure 7:
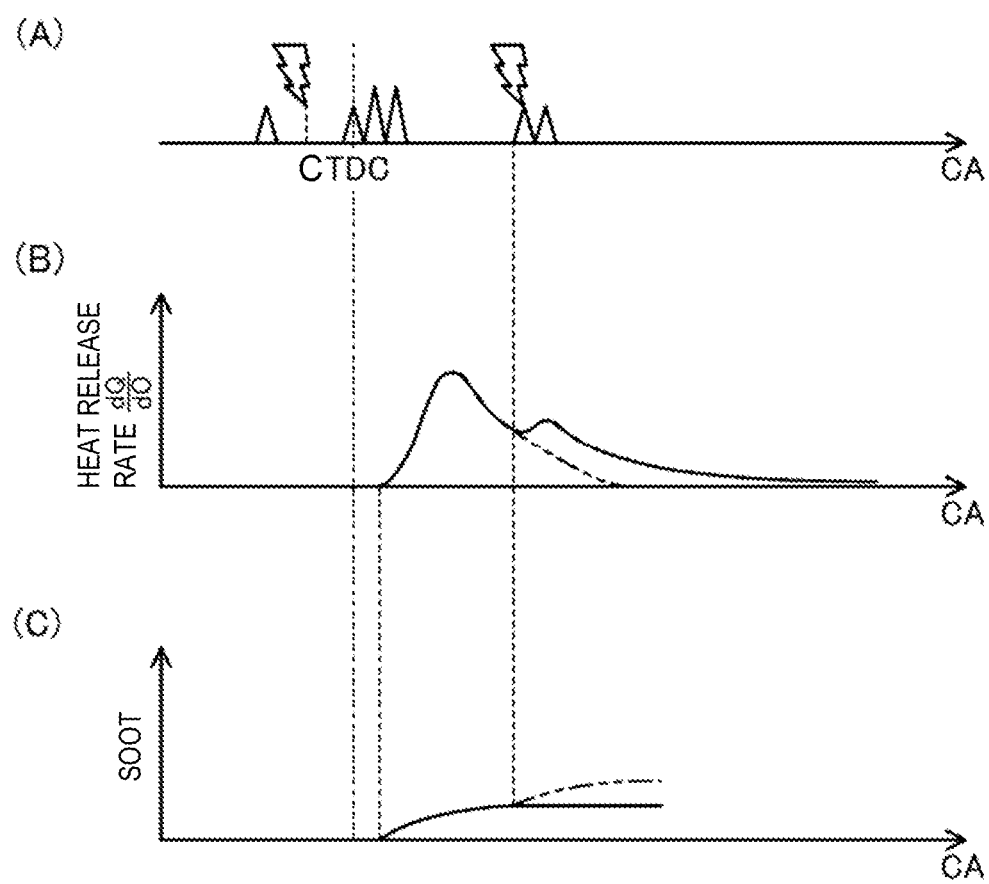
FIG. 7 shows time charts of when the post injection is performed, in which part (A) indicates a fuel injection, part (B) indicates a heat release rate, and part (C) indicates a production amount of soot.

Further, the engine controller 100 controls the injector 33 to perform a post injection after a main injection under a predetermined operation condition. Hereinafter, the operation for performing the post injection is described with reference to the flowchart in FIG. 6 and the time charts in FIG. 7. In FIG. 7, part (A) indicates the fuel injection and the ozone generation, and part (B) indicates a heat release rate, and part (C) indicates a production amount of soot. The main injection is an injection of the fuel for causing the main combustion (combustion for generating an engine torque, combustion which produces a largest heat amount in a single cycle), and the post injection is an injection performed after the main injection with a time interval therefrom. The post injection is performed for increasing the temperature of the exhaust gas (hereinafter, referred to as "exhaust gas temperature").

First, at S1, the engine controller 100 reads the detection results of the various sensors. For example, the various sensors include the crank angle sensor, the vehicle speed sensor, the accelerator opening sensor, the catalyst temperature sensor 26, and the exhaust gas temperature sensor 27.

Next, at S2, the engine controller 100 determines whether to perform the post injection, based on the detection results of the various sensors. The engine controller 100 determines whether the exhaust gas temperature needs to be increased, and if needed, it determines to perform the post injection. For example, the engine controller 100 determines whether the catalyst 25 is activated, based on whether the catalyst temperature detected by the catalyst temperature sensor 26 is higher than a predetermined temperature. If the catalyst 25 is inactivated, the engine controller 100 determines to perform the post injection. Moreover, in a case where the engine 1 collects the heat of the exhaust gas to utilize it in warming up the cabin of the vehicle, the engine controller 100 determines whether the exhaust gas temperature needs to be increased based on the temperature inside the cabin, the exhaust gas temperature and the like, and if needed, the engine controller 100 determines to perform the post injection.

When the engine controller 100 determines to perform the post injection, the post injection is performed after the main injection. Specifically, as illustrated in part (A) of FIG. 7, the engine controller 100 controls to perform a pre-injection, the main injection, and the post injection. The pre-injection is performed before the CTDC. The pre-injection is performed to improve ignitability in the main injection, and the injection amount of the fuel is comparatively small. The main injection is performed near the CTDC. In the example of part (A) of FIG. 7, the main injection includes three continuous injections, which are performed successively from immediately before the CTDC to an early stage of expansion stroke. The post injection is performed during the expansion stroke with the time interval from the main injection. The post injection includes two continuous injections, and the total injection amount of fuel is smaller than the main injection.

According to such an injection mode, the heat release rate illustrated in part (B) of FIG. 7 is obtained. Specifically, the fuel injected by the main injection and the fuel injected by the pre-injection ignite immediately after the CTDC and the main combustion occur. The heat release rate sharply increases from this time point. The heat release rate eventually reaches its peak and then decreases. The timing of performing the post injection is set to be after the peak of the heat release rate of the main combustion. In other words, the post injection is performed while the heat release rate decreases. Due to the combustion of the fuel injected by the post injection, the decreasing heat release rate temporarily increases or the decreasing speed of the heat release rate temporarily slows down. Thus, the heat release rate increases by the length or fuel amount of the post injection, and the combustion period accordingly extends.

Here, the engine controller 100 controls the ozone generator 4 to generate ozone. Specifically, ozone is generated by the ozone generator 4 after the pre-injection but before the main injection (hereinafter, referred to as the "first ozone application"). Here, the cylinder block 12 and the cylinder head 13 and the like are grounded, and thus, when the short-pulsed high voltage is applied to the electric discharge plug 41, electric discharge occurs between an inner wall of the combustion chamber 17 and the electrode 41a (the electrode 41a corresponds to an anode and the inner wall of the combustion chamber 17 corresponds to a cathode). Since the voltage to be applied is controlled to the predetermined short-pulsed high voltage, only the streamer electric discharge occurs inside the combustion chamber 17. Therefore, there is almost no possibility of causing a spark or heat. Since a dielectric body is not provided to the electrode 41a and the ozone is directly generated inside the combustion chamber 17, the ozone generation efficiency and energy utilization efficiency can be improved. By the first ozone application, the fuel injected by the pre-injection and oxygen inside the combustion chamber 17 are activated, and the ignitability for the main combustion can be improved.

Additionally, the engine controller 100 controls the ozone generator 4 to generate ozone in synchronization with the post injection (hereinafter, referred to as the "second ozone application"). Thus, the voltage is applied to the electric discharge plug 41 during the post injection. Specifically, drops of the fuel have a lower electric resistance than air, and therefore, when the drops of the fuel exist inside the combustion chamber 17, electric discharge easily occurs between the electrode 41a and the drops. As a result, the electric discharge occurs easier than in the case where the electric discharge occurs between the electrode 41a and the inner wall of the combustion chamber 17, which can improve the ozone generation efficiency. Note that, the phrase "synchronization" used here does not only include a case where the ozone generation period entirely overlaps with the period of the post injection, but also includes a case where they partially overlap.

According to the second ozone application, the ozone acts on the fuel injected by the post injection, and OH radicals are generated. Oxidation of soot which is produced by the combustion of the fuel injected by the post injection is stimulated by the OH radical.

Specifically, in the main combustion, since soot is produced by the fuel partially combusting in a state with an insufficient amount of oxygen, as illustrated in part (C) of FIG. 7, the amount of soot increases little by little as the main combustion progresses. Here, without the second ozone application, as indicated by the two-dotted chain line, the amount of soot increases due to the post injection. Because the oxygen inside the combustion chamber 17 is used by the preceding main combustion, by the timing that the post injection is performed, the environment in the combustion chamber 17 is in the state with insufficient amount of oxygen. Therefore, even though the injection amount of the post injection is small, soot is easily produced. On the other hand, by performing the second ozone application in synchronization with the post injection, the oxidation of soot which is produced when the fuel injected by the post injection combusts can be stimulated. As a result, the production amount of soot can be reduced to about the same amount as the case without the post injection.

Then, at S4, the engine controller 100 determines whether the exhaust gas temperature is a target temperature or higher, based on the detection result of the exhaust gas temperature sensor 27. If the exhaust gas temperature is the target temperature or higher, the engine controller 100 returns (proceeds to the start of the next flow). As a result, the post injection is determined as unnecessary at S2 in the next flow, and the post injection is not performed thereafter. On the other hand, if the exhaust gas temperature is lower than the target temperature, at S5, the engine controller 100 increases the injection amount of the post injection and then returns (proceeds to the start of the next flow). As a result, the post injection is also determined as necessary at S2 in the next flow, and subsequently to S2, the post injection is performed with the increased injection amount at S3. By repeating this control, the injection amount of the post injection is increased little by little until the exhaust gas temperature reaches the target temperature.

As described above, the control device of the engine 1 includes the engine body, the injectors 33, the ozone generator 4, and the engine controller 100. The engine body has the pistons 15 provided inside the respective cylinders 11, and the combustion chambers 17 each formed by the corresponding cylinder 11 and the corresponding piston 15. The injectors 33 inject the fuel into the combustion chambers 17, respectively. The ozone generator 4 generates ozone inside the combustion chamber 17. The engine controller 100 controls the injectors 33 and the ozone generator 4. The engine controller 100 controls each injector 33 to inject the fuel and, after this fuel ignites, inject the fuel again. The engine controller 100 controls the ozone generator 4 to generate ozone in synchronization with the fuel injection that is performed by the injector 33 after the ignition.

According to this configuration, fuel is injected again after the ignition, and thus, the oxygen amount inside the combustion chamber 17 becomes small by the timing that the fuel injected after the ignition combusts. Therefore, the combustion chamber 17 forms the environment where soot is easily produced. For this reason, the ozone generation synchronizing with the fuel injection after the ignition (second ozone application) is performed. Thus, OH radicals are generated by the fuel injected after the ignition and the oxidation of soot is stimulated. As a result, smoke can be reduced.

Specifically, the engine controller 100 controls the injector 33 to perform the main injection and the post injection that is performed on the expansion stroke after all of the fuel injected by the main injection is ignited, with a time interval from the main injection. The engine controller 100 controls the ozone generator 4 to generate ozone in synchronization with the post injection.

According to this configuration, in the case where the post injection is performed, smoke produced by the post injection can be reduced.

Further, the control device of the engine 1 also includes the catalyst 25 provided inside the exhaust passage 24, and the engine controller 100 controls the injector 33 to perform the post injection when the catalyst 25 is not active.

According to this configuration, the catalyst 25 can be activated by performing the post injection. Moreover, by performing the ozone generation in synchronization with the post injection, both the activation of the catalyst 25 and the reduction of smoke can be achieved.

Figure 8:
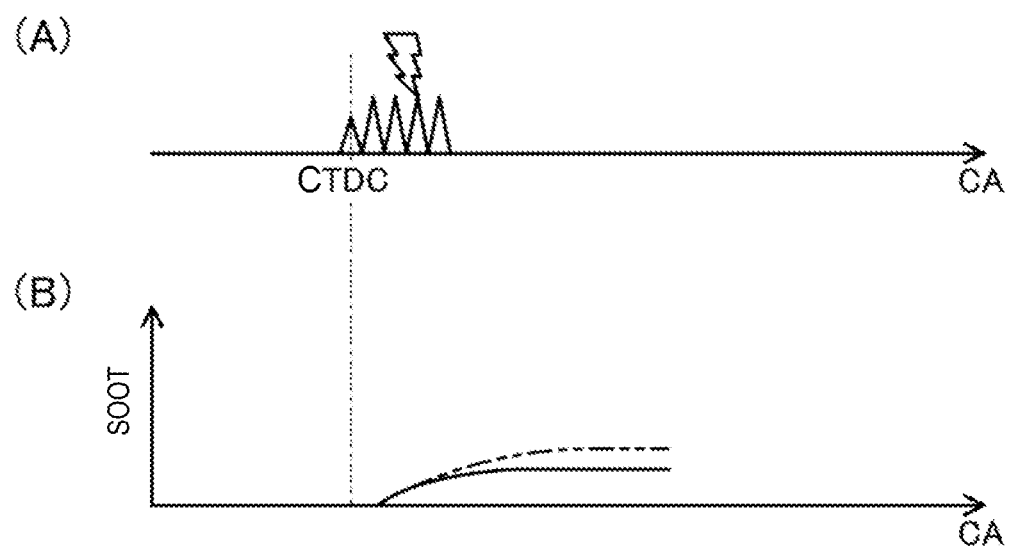
FIG. 8 shows time charts of when ozone is generated in a modification, in which part (A) indicates a fuel injection, and part (B) indicates a production amount of soot.

Note that, as illustrated in the time charts of FIG. 8, the engine controller 100 may control the injector 33 to perform the main injection and may control the ozone generator 4 to generate ozone in synchronization with the main injection which continues even after the injected fuel in the main injection ignites. Part (A) of FIG. 8 indicates timings of the fuel injection and the ozone generation, respectively, and part (B) of FIG. 8 indicates the production amount of soot.

Specifically, the engine controller 100 controls the injector 33 to perform the main injection including five continuous injections, from immediately before the CTDC to the early stage of the expansion stroke. In this example, the pre-injection and the post injection are not performed. The fuel injected by the main injection ignites before the main injection is completed. When the fuel ignites, the production amount of soot starts to increase. Here, the engine controller 100 controls the ozone generator 4 to generate ozone in synchronization with the main injection which continues even after the ignition. In other words, the ozone is generated in synchronization with the final stage of the main injection. Since the oxygen inside the combustion chamber 17 is used to combust the fuel injected before the final stage of the main injection, by the timing that the fuel injected in the final stage of the main injection combusts, the oxygen amount easily becomes insufficient. Therefore, by generating ozone in synchronization with the final stage of the main injection, the ozone acts on the fuel injected in the final stage of the main injection, and OH radicals are produced from the fuel, and the oxidation of soot produced by the fuel combustion can be stimulated. Without this ozone application, as indicated by the two-dotted chain line in part (B) of FIG. 8, the production amount of soot increases as the main combustion progresses. On the other hand, by performing the ozone application in the final stage of the main injection, the soot produced in the final stage of the main combustion can be reduced.

<Other Embodiments>

The above embodiment is described as an instantiation of the present invention. However, the present invention is not limited to this embodiment, and it can be applied to various embodiments with suitable changes, replacements, additions, omissions, etc. Moreover, another embodiment can be obtained by combining any of the components described in the above embodiment. Furthermore, not all the components illustrated in the appended drawings and described in the above embodiment are essential in terms of achieving the main aim of the present invention, and they may include components which are unessential in terms of achieving the main aim of the present invention, for illustrating the present invention. Therefore, those unessential components should not instantly be recognized as essential only because they are illustrated in the appended drawings and described in the above embodiment.

The following configurations may be adopted to the embodiment.

For example, the ozone generator 4 is not limited to the above configuration. Any configuration may be adopted as long as the ozone can be applied after the fuel ignition.

The tip of the electrode 41a of the electric discharge plug 41 may not be located closer to the ridge part 15d of the piston 15 than to the center 15c of the cavity 15b in the state where the piston 15 is at the CTDC. For example, the tip of the electrode 41a may be closer to the center 15c of the cavity 15b.

Further, in the above description, the post injection for activating the catalyst 25 is described; however, the aim of the post injection is not limited to this. The production of soot can be reduced by combining the ozone generation with any fuel injection as long as it is a fuel injection performed after the main injection with a time interval. Moreover, without limiting to the post injection, the ozone generation can be combined with any fuel injection as long as it is a fuel injection performed after a fuel ignition.

Note that, in the above example, the heat-insulating structures of the combustion chambers 17 and the intake ports 18 are adopted and the heat-insulating layer is formed inside the cylinder (combustion chamber 17) by the gas layer; however, the present invention may be applied to the engine in which the heat-insulating structures of the combustion chamber 17 and the intake ports 18 or the heat-insulating layer inside the cylinder are not adopted.

Moreover, the engine 1 performs the self-ignition combustion over the entire operating range; however, it is not limited to this. An engine in which self-ignition combustion is performed only within a part of the operating range and diffusion combustion caused by spark ignition is performed within other part of the operating range may be adopted, or an engine in which diffusion combustion is performed over the entire operating range may be adopted. In this case, the engine includes ignition plug(s).

Furthermore, the engine 1 is not limited to being a gasoline engine. It may be a diesel engine in which the ozone generation synchronizing with the fuel injection after the ignition is performed.

As described above, the present invention is useful for control devices of direct-injection engines.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
11 Cylinder
15 Piston
17 Combustion Chamber
24 Exhaust Passage
25 Catalyst
33 Injector
4 Ozone Generator
100 Engine Controller (Controller)

What is claimed is:

1. A control device of a direct-injection engine, comprising:
   an engine body having a piston provided inside a cylinder, and a combustion chamber formed by the cylinder and the piston;
   an injector for injecting fuel into the combustion chamber;
   an ozone generator for generating ozone inside the combustion chamber;
   a controller for controlling the injector and the ozone generator; and
   a catalyst provided inside an exhaust passage, wherein
   the controller controls the injector to inject a first amount of the fuel and, after this fuel is ignited, to inject a second amount of the fuel, and the controller controls the ozone generator to generate ozone in synchronization with the fuel injection that is performed by the injector after the fuel ignition,
   the controller controls the injector to perform a main injection and a post injection in which a fuel injection is performed on expansion stroke after all of the first amount of the fuel injected by the main injection is ignited, with a time interval from the main injection,
   the controller controls the ozone generator to generate ozone in synchronization with the post injection,
   the controller performs a first ozone application in which the ozone generator is controlled to generate ozone on a compression stroke before the main injection, and the controller performs a second ozone application in which the ozone generator is controlled to generate ozone at a timing such that a period of generating ozone at least partially overlaps with a period of performing the post injection,
   the controller controls the injector to perform the post injection when the catalyst is inactivated, and
   the controller stops the post injection by the injector and the second ozone application by the ozone generator when the catalyst is activated.

2. The control device of claim 1, wherein the post injection is performed while a heat release rate of a main combustion decreases after reaching a peak thereof.

* * * * *